(12) United States Patent
Schneider et al.

(10) Patent No.: US 9,902,201 B2
(45) Date of Patent: Feb. 27, 2018

(54) METHOD AND DEVICES FOR DETECTING AND RECTIFYING PROBLEMS IN CONNECTION WITH A VEHICLE LOAD

(71) Applicant: Robert Bosch GmbH, Stuttgart (DE)

(72) Inventors: Marcus Schneider, Ludwigsburg (DE); Ulrich Klee, Stuttgart-West (DE); Frank Suessenbach, Leonberg (DE); Christian Hoffmann, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 615 days.

(21) Appl. No.: 14/367,169

(22) PCT Filed: Nov. 21, 2012

(86) PCT No.: PCT/EP2012/073259
§ 371 (c)(1),
(2) Date: Nov. 11, 2014

(87) PCT Pub. No.: WO2013/092090
PCT Pub. Date: Jun. 27, 2013

(65) Prior Publication Data
US 2015/0217688 A1    Aug. 6, 2015

(30) Foreign Application Priority Data

Dec. 22, 2011    (DE) .................. 10 2011 089 520

(51) Int. Cl.
*G01M 17/04*    (2006.01)
*B60C 5/00*    (2006.01)
(Continued)

(52) U.S. Cl.
CPC ............... *B60C 5/005* (2013.01); *B60Q 1/00* (2013.01); *G01G 19/086* (2013.01); *G01S 13/02* (2013.01);
(Continued)

(58) Field of Classification Search
USPC .......................................... 73/117.01, 117.03
See application file for complete search history.

(56) References Cited

U.S. PATENT DOCUMENTS 5,170,366 A * 12/1992 Passarelli ............... G01G 19/08
702/41
5,912,439 A * 6/1999 Eran ..................... B60G 17/019
177/136
2009/0157257 A1 6/2009 Voigtlaender et al.

FOREIGN PATENT DOCUMENTS

DE       101 27 567      12/2002
DE    10 2005 025 851    12/2006
(Continued)

OTHER PUBLICATIONS

International Search Report for PCT/EP2012/073259, dated Jul. 10, 2013.

*Primary Examiner* — Eric S McCall
(74) *Attorney, Agent, or Firm* — Norton Rose Fulbright US LLP; Gerard Messina (57) ABSTRACT

In a method for recognizing a load state and for removing problems that may result from such a load state of a vehicle, measures are provided for recognizing the overall vehicle mass and/or load mass of a vehicle as well as for detecting a non-uniform load of a vehicle, and reaction possibilities are provided for the functionality, impaired by such a load, of a distance sensor situated on the vehicle.

13 Claims, 4 Drawing Sheets

(51) Int. Cl.
    *G01G 19/08*    (2006.01)
    *G01S 15/93*    (2006.01)
    *G01S 15/08*    (2006.01)
    *G01S 15/87*    (2006.01)
    *B60Q 1/00*     (2006.01)
    *G01S 13/02*    (2006.01)
    *G01S 15/02*    (2006.01)
    *G01S 17/02*    (2006.01)

(52) U.S. Cl.
    CPC .............. *G01S 15/02* (2013.01); *G01S 15/08* (2013.01); *G01S 15/872* (2013.01); *G01S 15/931* (2013.01); *G01S 17/02* (2013.01)

(56) References Cited

FOREIGN PATENT DOCUMENTS

| | | |
|---|---|---|
| DE | 10 2008 038 615 | 3/2009 |
| DE | 10 2009 047284 | 6/2011 |
| EP | 2 144 081 | 1/2010 |
| WO | WO 2004/104623 | 12/2004 |
| WO | WO 2006/097498 | 9/2006 |

\* cited by examiner

METHOD AND DEVICES FOR DETECTING AND RECTIFYING PROBLEMS IN CONNECTION WITH A VEHICLE LOAD

BACKGROUND OF THE INVENTION

1. Field of the Invention

The present invention relates to methods and to devices for recognizing and removing problems that arise in connection with a load of a vehicle.

2. Description of the Related Art

An excessive overall vehicle mass can be just as problematic for driving safety as a non-uniform load. In particular in transporters, as well as trucks, the cargo area for the load can occupy a significant volume, so that the possible load mass relative to the empty mass of the vehicle cannot be disregarded. Vehicle functions and operating parameters can, as a result, change so strongly that limitations in functioning and in operational safety may result. A load state can also present a problem for sensor systems installed in the vehicle. In the context of these aspects, in the existing art for example devices are known that include sensors that are provided on the chassis and that recognize the shortening of spring paths in response to a change in the vehicle load state. In addition, devices are known by which the beam width regulation of headlamps can be carried out automatically. A separate provision of sensors for acquiring a load state of a vehicle however entails an increase in costs and mass, and in system complexity.

A known method for determining a load mass and/or an overall vehicle mass is described in the following. The method is used to determine a load mass and/or an overall mass of a vehicle, the method including the steps: determination of a drive torque during acceleration and/or determination of a braking torque during deceleration, and determination of the vehicle acceleration or deceleration, and determination of an overall vehicle mass using these determined operating quantities. In connection with the present invention, a "load mass" is in general to be understood as that mass that, by bringing material into the vehicle, increases its overall weight. In order to recognize a current load mass, or overall vehicle mass, the method proposes that during acceleration of the vehicle a drive torque of the engine or of other components be determined. Alternatively or in addition, during deceleration ("braking") a braking torque can be determined. Such operating parameters are already determined anyway in modern vehicles, e.g. for engine controlling, transmission controlling, and chassis controlling, and are made available in bus systems. In particular in engine control devices of modern vehicles, the driver's wishes (e.g. "acceleration") are already converted digitally anyway, for example into engine control commands, so that the determination can be made without requiring a separate hardware outlay. In addition, the method includes a step of the determination of the vehicle acceleration or deceleration. The above-named data are also already determined anyway in modern vehicles and are kept ready in digital form (for example for the on-board computer or trip planning).

BRIEF SUMMARY OF THE INVENTION

The method now further proposes that the overall vehicle mass be determined from the drive torque or from the braking torque together with the determined vehicle acceleration or deceleration, on the basis of known physical relationships. This mass can be evaluated by an evaluation unit with regard to the maximum permissible overall vehicle mass, and as needed a signal to the driver of the vehicle can be triggered in response to the result of the evaluation. Alternatively, or in addition, the (in most cases known) empty weight of the vehicle can be retrieved from storage means and subtracted from the determined overall vehicle mass in order to determine the actual load of the vehicle, and also to compare it with reference values stored in storage means. Through the method, a simple possibility is provided for using existing sensor systems to make inferences concerning the current overall vehicle mass or load mass of a vehicle.

According to an aspect of the present invention, an alternative method is proposed for determining a load mass and/or an overall mass of a vehicle. Correspondingly, a portion, changing with time, of a signal of an acceleration sensor is determined. Here, the acceleration sensor can for example be the acceleration sensor of a system for electronic stability controlling of the vehicle. In comparison to the above-named method, however, the longitudinal acceleration of the vehicle is not determined; rather, rocking and/or tilting movements enabled by the chassis suspension system of the vehicle are detected and, using a rigidity value for the vehicle suspension, in particular also using the associated damping of the vehicle suspension, are used to determine the mass of the vehicle. In a known manner, the frequency with which a spring-mass system oscillates is defined by the oscillating mass and by the (known) spring rigidity and, if warranted, an associated damping value. If the oscillating portion of the vehicle mass (the load and the vehicle empty weight minus the wheels and corresponding parts of the wheel suspension) is set into oscillation, then depending on the form of the oscillation there results a frequency that can be determined via the acceleration sensors in the vehicle, with which the vehicle and its load oscillates, or seeks to come to a rest state. If the parameters spring rigidity and damping of the chassis are known, and the frequency is determined via the acceleration sensor system of the vehicle, then according to the present invention, given knowledge of the mode of oscillation, the oscillating mass can be inferred. In order to enable measurement of the oscillation frequency, or the movement for returning to the rest state, the method according to the present invention proposes that a braking intervention be carried out, in particular automatically, through which an oscillation of the vehicle is provoked.

According to a further aspect of the present invention, a method is proposed for determining a non-uniform mass distribution of a load of a vehicle. In the context of the present invention, a non-uniform mass distribution of a load of a vehicle is in particular to be understood as a distribution that causes different spring paths of the chassis suspension, such that there results a significantly tilted position of the vehicle. In order to determine this tilted position, the method according to the present invention proposes that an acceleration sensor situated in the vehicle, which can also be provided for other purposes (e.g. an electronic stability program, or ESP) and in other control devices, be evaluated in order to determine whether this sensor produces longitudinal or transverse acceleration signals solely on the basis of the tilted position of the vehicle. For this purpose, the signals of the acceleration sensor can be averaged over a predefined time duration, so that a temporary tilted position, for example due to driving over an object or an inclined street segment, is not recognized as a non-uniform mass distribution of the load of the vehicle. For the same purpose, averaging can take place over a predefined travel distance of the vehicle, which has a comparable effect. Moreover, the signal of the acceleration sensor can be acquired, averaged, and evaluated at a particular time, in particular at a plurality of points in time. In addition, the determined longitudinal or transverse acceleration values can be examined in order to find out whether they are below a prespecified maximum boundary value that has been defined for a maximum possible tilted position of the vehicle due to misloading. In this way, a recognition of a tilted position due to a (longer-duration) period of driving uphill or downhill can be avoided. Of course, measurement values that are recognizably outliers can also be eliminated from the value cohort before further processing.

According to a further aspect of the present invention, a device is proposed for determining a non-uniform mass distribution of a load of a vehicle that includes an evaluation unit. This unit is set up to evaluate signals of an acceleration sensor situated in the vehicle and to carry out the method steps as discussed in connection with the above-explained method. The boundary values for maximum tilted positions that can be reached through a misloading can be retrieved by the evaluation unit from storage means that can additionally be provided in the device.

Advantageously, according to the method according to the present invention, or to the device according to the present invention, a plausibilization can take place of the determined acceleration values, using determined satellite navigation data. In a known fashion, satellite signals can be used to determine a height of an object to be located, which of course also holds for changes in height that take place over time. The determined acceleration signals can therefore be plausibilized on the basis of satellite navigation data in order to find out whether they were determined during travel uphill or downhill. In addition, the determined acceleration sensor data, despite the travel uphill or downhill, can be used to determine a non-uniform mass distribution of the load of the vehicle by taking into account, during the evaluation, the average tilted position on the basis of the change in height that takes place. In a similar manner, for the evaluation of the signals of the acceleration sensors map material including information about the height profile of a path segment that is traveled can be taken into account.

According to a further aspect of the present invention, a method is made available for recognizing and evaluating a load state, in particular an asymmetrical load state, of a vehicle. In the context of the present invention, an "asymmetrical" load state is to be understood as a non-uniform distribution of mass relative to a center longitudinal axis of the vehicle, running in the direction of travel. In other words, an asymmetrical non-uniform load of the vehicle causes an inclination of the vehicle in the direction of the driver side or passenger side. The method according to the present invention proposes the use of at least one sensor to receive and evaluate a reflection of a region of the roadway surface situated next to the vehicle. Such a sensor can for example be an ultrasound sensor or radar sensor, but can also use other principles of operation (e.g. laser, lidar, etc.). Such a sensor can of course also include a transmitter by which it can emit corresponding signals to the surrounding environment. In the context of the present invention, "situated next to the vehicle" is to be understood in particular, but not exclusively, as referring to a region situated to the left and to the right of the vehicle with respect to the direction of travel, so that regions situated in front of or behind the vehicle are also next to the vehicle. The reflections of the roadway surface received by the sensor can be investigated or evaluated with regard to their energy and/or runtime, so that a tilted position resulting in response to a load of the vehicle causes a changed energy or distance profile. However, the method according to the present invention is intended to recognize not only a tilted position of the vehicle but also a "global" lowering of the vehicle due to a load, through which the sensors situated in the vehicle do not change their orientation with respect to the roadway surface, but come closer to it. In particular in the case of small transporters, the spring path, which is strongly a function of the load, can be up to 20 cm. In view of such a spring path, it can be seen that standard installation heights, for example of sensors for parking assistance, are in the range between 45 cm and 65 cm above the roadway. The resulting signal differences due to the roadway reflections are therefore substantial, and are suitable for an evaluation of the load state.

According to a further aspect of the present invention, a device is proposed for recognizing and evaluating a load state, in particular an asymmetrical one, of a vehicle, in particular of an automobile. The device includes at least one sensor situated on the vehicle, for which the statements made in connection with the above-described method hold. In addition, the device includes an evaluation unit that is set up to evaluate the sensor signals. The functionality of the device and its features corresponds to the previously described method steps, so that a detailed explanation is omitted here in order to avoid repetition.

Preferably, the sensor can be situated in the region of a vehicle longitudinal side, where distance sensors are provided on vehicles in particular for the purpose of so-called side view assistance systems (blind spot recognition). These are situated in particular in the area of external mirrors (in particular in passenger vehicles) or in the area of the bumper or fenders (transporters, trucks). Of course, however, sensors of a parking assistance system or of some other collision protection systems can also be situated in the area of the vehicle longitudinal side.

Alternatively, reflections can preferably be received and evaluated using two sensors. With regard to a recognition of a tilted position of the vehicle, here it is in particular recommended to provide the sensors at different, oppositely situated sides of the vehicle, and to use a difference signal of the two sensors to determine the tilted position. Because the one vehicle side tilts in the direction of the roadway surface and the opposite vehicle side tilts away from the roadway surface, the difference signal of the two sensors is particularly clear with regard to reflections received from the roadway surface.

Also preferably, in the case of a load of the vehicle recognized as critically non-uniform, a signaling to the driver can take place by which the driver is requested to provide help. This can in particular take place through an optical display in the dashboard of the vehicle, and alternatively or in addition also as an acoustic signal. Optionally, the driver's options with regard to selecting possible operating states of the vehicle can also be limited. For example, the engine controlling can be, influenced so that particular predefined maximum speeds can no longer be exceeded, or a radar-supported distance sensor system that may be present takes into account a prolonged braking path, e.g. so that driver takeover requests are outputted at minimum distances that are greater than those corresponding to a normal load.

In addition, the reflections received by the sensors can be examined in order to find out whether objects in the environment have caused the received signal shape. Because an object in the environment influences the sensor signal independent of the load state of the vehicle, the diagnosing of a critical load state is to be avoided when the sensor signal is situated by a reflecting object in the environment in the region of acquisition of the sensor.

According to a further aspect of the present invention, a method is proposed for adapting a sensor system in a vehicle to a load state of the vehicle. The sensor system includes a sensor that is set up to receive reflections from a region of the roadway surface situated next to the vehicle, at least in certain load states. In other words, the signal received by the sensor is influenced by the load state as indicated in connection with the above-described aspect of the present invention, in that the reflections from the roadway surface increase or become less. The method according to the present invention here includes a determination of a load state of the vehicle as described in particular in connection with the above-named aspects of the present invention. In addition, the method according to the present invention includes an adaptation of the evaluation of signals of the sensor in response to the determined load state. In other words, the sensor system is calibrated in response to a changed load situation of the vehicle, which can take place for example through the use of calibration factors stored in the sensor system. The calibration factors can for example be stored in tabular form in the sensor system according to the present invention. In response to a recognized load state, it is determined which load state class stored in the table is to be associated with the current load of the vehicle, and the sensor system is calibrated using the associated calibration factor.

According to a further aspect of the present invention, a sensor system for a vehicle is proposed by which the steps of the above-described method can be carried out. For this purpose, the sensor system includes an evaluation unit that is set up to determine information concerning the load state of the vehicle, in particular according to one of the methods described above or using one of the devices described above, and to adapt an evaluation of signals of the sensor in response to the current load state.

Preferably, the sensor that is to be calibrated in accordance with the present invention can be a distance sensor fashioned in particular as an ultrasound and/or radar sensor. Of course, the present invention is not limited to these embodiments. In addition, it will be clear to the person skilled in the art that the sensors that can be used in the context of the present invention can also be used and provided for other methods and devices in the vehicle. Advantageously, therefore, a large part of the inventive aspects described above can be limited to an intelligent use of hardware already present in the vehicle for the named purposes.

DETAILED DESCRIPTION OF THE INVENTION

Figure 1A:
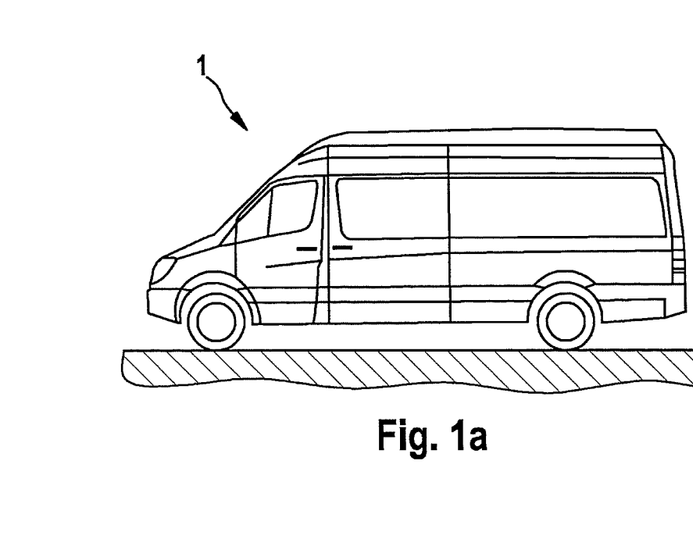
FIG. 1a shows a side view of an essentially unloaded vehicle.

FIG. 1a shows a side view of a uniformly loaded, or lightly loaded, vehicle 1. The suspension of the vehicle is loaded moderately and uniformly, which can be referred to as the "normal state" or adequate load distribution.

Figure 1B:
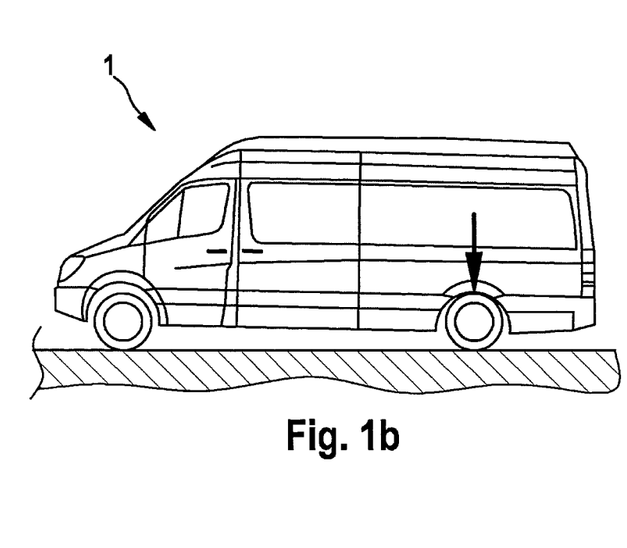
FIG. 1b shows a side view of a loaded vehicle.

FIG. 1b shows the vehicle 1 shown in FIG. 1a, whose rear has recognizably lowered relative to its front (see arrow). As a result, the remaining spring path and the distance between the roadway surface and the bumper of vehicle 1 has been significantly reduced.

Figure 2:
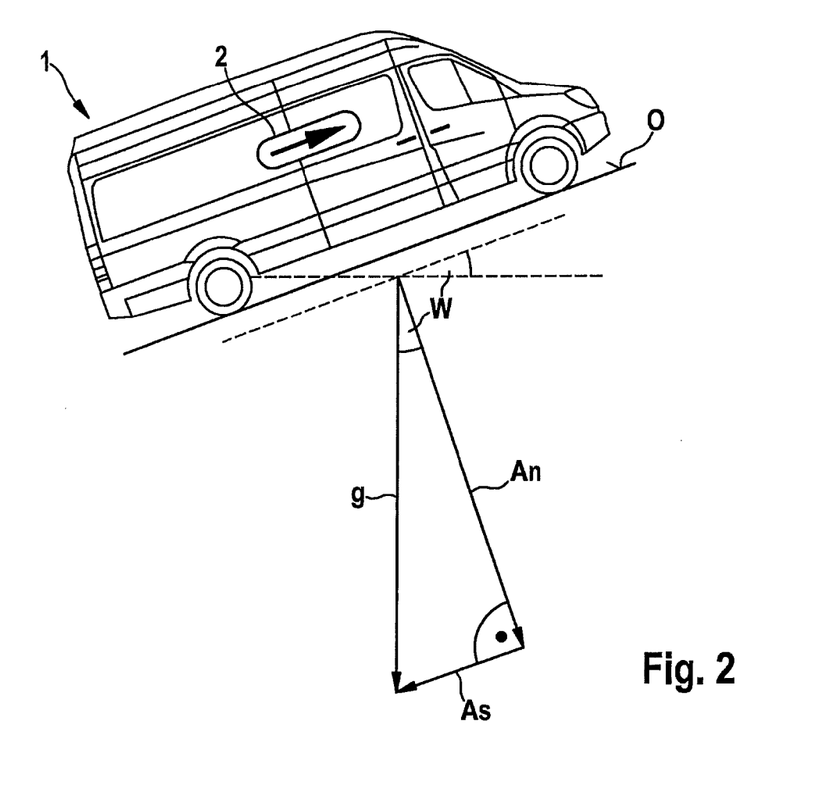
FIG. 2 shows a schematic drawing showing the influence of a tilting of a vehicle on a signal of a longitudinal acceleration sensor.

FIG. 2 shows a vehicle 1 having a (longitudinal) acceleration sensor 2. The right triangle shown underneath the vehicle clearly indicates that a tilted position of the vehicle has the result that a longitudinal acceleration sensor (e.g. of an ESP) determines a longitudinal acceleration $A_s$, although the vehicle is at rest or is in uniform motion. Alternatively, an acceleration of the vehicle can result in the depicted acceleration components. Longitudinal acceleration $A_s$ results due to the right-angled decomposition of gravitation g into a normal acceleration $A_n$ (normal to the longitudinal direction of the vehicle) and a longitudinal acceleration $A_s$ oriented parallel to the longitudinal direction of the vehicle. The greater angle w between the horizontal and roadway surface O becomes, the greater longitudinal acceleration signal $A_s$, determined by acceleration sensor 2, becomes.

Figure 3A:
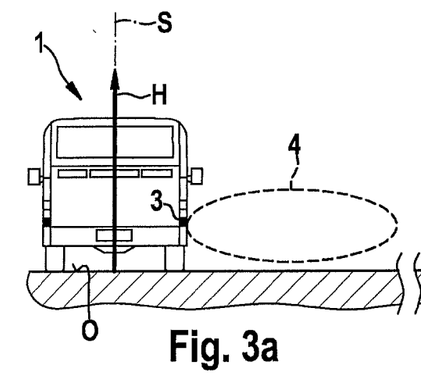
FIG. 3a shows a vehicle 1 equipped according to the present invention in the unloaded state.

FIG. 3a shows a vehicle 1, having a distance sensor 3, containing a uniform load or no significant load. This is shown on the one hand by a vertical axis H parallel to the roadway normal, and by an acquisition region 4 of distance sensor 3 situated above roadway surface O.

Figure 3B:
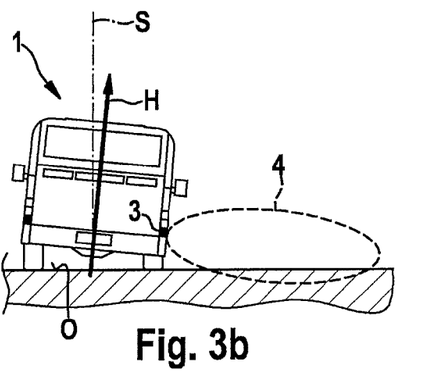
FIG. 3b shows a vehicle equipped according to the present invention in the asymmetrically loaded state.

FIG. 3b shows the effect of an asymmetrical load distribution for the case of a loading at the right side of vehicle 1. Vertical axis H of vehicle 1 is tilted to the right relative to roadway normal S, causing acquisition region 4 of distance sensor 3 to collide significantly with roadway surface O. Without correction, this would have the result that distance sensor 3 reports an object, although only roadway surface O is acquired.

Figure 4A:
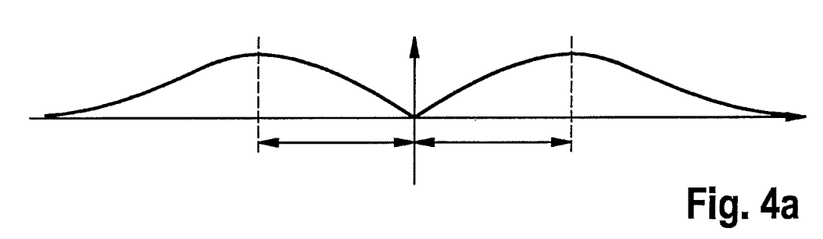
FIG. 4a shows a possible amplitude curve of signals recorded by two distance sensors.

FIG. 4a shows an amplitude curve over the distance to a left, or right, sensor, as could be received by vehicle 1 in FIG. 3a. Because the vehicle does not have a tilted position, the amplitude curves of the sensor signals are essentially symmetrical.

Figure 4B:
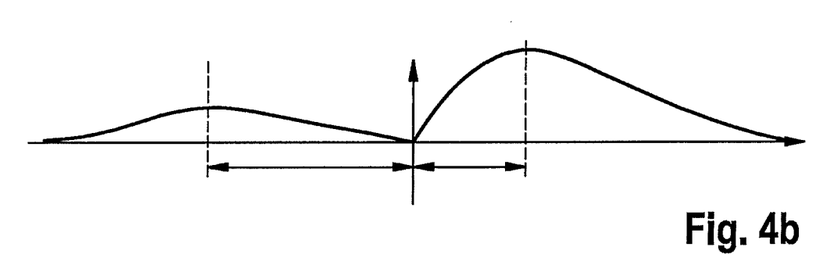
FIG. 4b shows a possible amplitude curve of signals recorded by two distance sensors in the case of asymmetrical loading.

FIG. 4b shows the amplitude curve of sensor signals as could be reported by distance sensors 3 of vehicle 1 shown in FIG. 3b. Because the right side of the vehicle has tilted in the direction of roadway surface O, right distance sensor 3 reports a significantly increased amplitude whose maximum is now at a smaller distance from sensor 3. In contrast, the amplitude of the signal reported by left distance sensor 3 is significantly attenuated, and its maximum has a larger distance from the axis origin (corresponding to the sensor surface).

Figure 5:
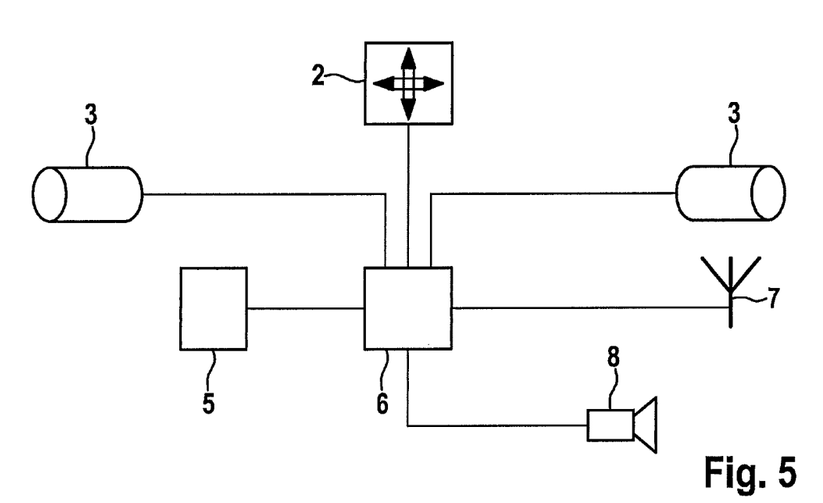
FIG. 5 shows a schematic overview of components of a device according to the present invention.

FIG. 5 shows a schematic overview of components of an exemplary embodiment of a device according to the present invention. Two distance sensors 3, as well as an acceleration sensor 2 and a storage device 5, and an antenna 7 and a loudspeaker 8, are connected to an evaluation unit 6. Here, the acceleration sensor can for example be realized as a 3-D acceleration sensor, and can thus acquire both longitudinal and transverse accelerations and report them to evaluation unit 6. Antenna 7 can for example be set up to receive satellite navigation signals. Loudspeaker 8 here represents signaling means that can also include an optical display. In storage means 5, reference values as well as map material can be stored which can be used by evaluation unit 6 in the course of the evaluation of sensor signals and the determination of a load state, and adaptation or calibration of distance sensors 3.

Figure 6:
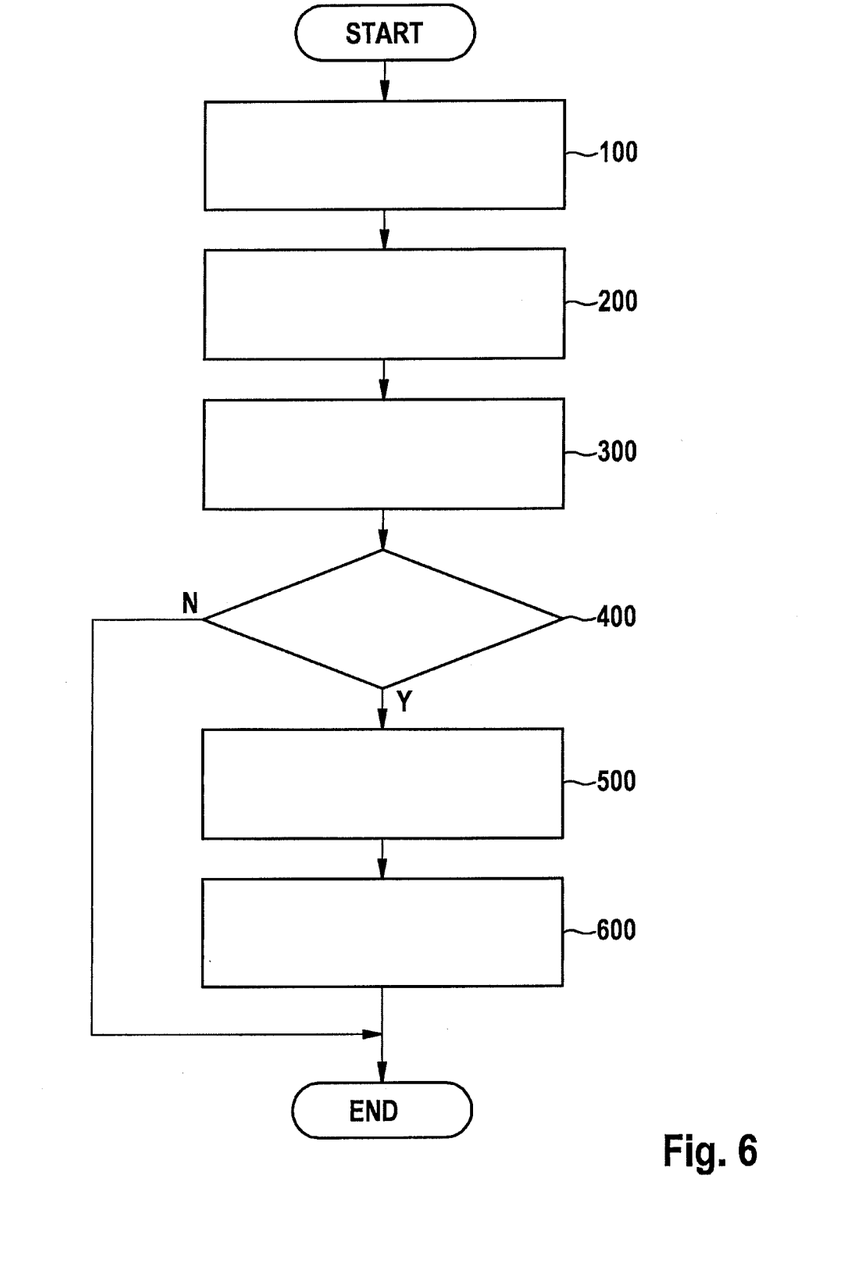
FIG. 6 shows a flow diagram illustrating the steps of an exemplary embodiment of the method according to the present invention.

FIG. 6 shows a flow diagram illustrating steps of an exemplary embodiment of a method according to the present invention. The method begins for example by actuating the ignition or putting the vehicle into a drive gear. In step 100, sensor data are received that can originate for example from distance sensors 3 as well as acceleration sensors 2. In step 200, the received sensor data are respectively compared with associated reference values. With regard to received acceleration values, for example a plausibilization can take place to find out whether it is even possible that the determined longitudinal or transverse acceleration could have been caused by a non-uniform loading of the vehicle. With regard to the signals of distance sensors 3, the reference values can represent for example the amplitude curve shown in FIG. 4a, to which the currently received sensor data are compared in order to recognize a tilted position. Alternatively or in addition, a difference formation of the signals of distance sensors 3 can take place in order to make it possible to determine the influence of a tilted position particularly well. In step 300 there takes place a checking of the received signals of distance sensors 3 for environmental objects that may have been acquired. This can for example take place a checking of the amplitude curves shown in FIGS. 4a and 4b in order to find out whether these curves have bends or jumps or other characteristics that could in general occur given the presence of environmental objects in the region of acquisition. In step 400, on the basis of the results of the preceding steps it is decided whether a critical tilted position, or asymmetrical load of vehicle 1, is present. If this is not the case N, the method ends. If this is the case Y, then in step 500 a corresponding signaling is outputted to the driver of vehicle 1. The driver can for example be requested to bring about a different load distribution or to accept certain limitations in the choice of operating quantities of the vehicle (e.g. limitation of the maximum speed). In step 600, distance sensors 3 are calibrated to the recognized tilted position. In other words, the evaluation of the signals of distance sensors 3 is modified such that subsequently the signals can be evaluated as if vehicle 1 were in the uniformly loaded or unloaded state. This can include the retrieval of calibration factors from a table stored in a storage device 5, stored for load states (load state classes) coming close to detected tilted positions.

The features and aspects of the present invention described above and discussed in detail are provided for illustration and for the understanding of the reader; modifications and an exchange of features between the discussed exemplary embodiments are also within the scope of the present invention, whose protective scope is defined solely by the accompanying claims.

What is claimed is:

1. A method for determining an asymmetrical load state of a vehicle, comprising:
   emitting, by at least one transmitter, an output signal;
   receiving, by at least one sensor, a reflected signal corresponding to the output signal reflected from a region of a roadway surface situated next to the vehicle;
   evaluating, by an evaluation unit, the reflected signal to determine whether an asymmetrical load state of the vehicle is present;
   wherein the at least one sensor is provided on a side region of the vehicle;
   wherein two sensors are provided on two vehicle sides situated opposite one another;
   wherein each sensor receives a reflected signal from a region of the roadway surface corresponding to a side of the vehicle on which the respective sensor is provided; and
   wherein the evaluating of the reflected signals includes (i) generating a difference signal by comparing the reflected signals received by the two sensors, and (ii) recognizing an asymmetrical load state of the vehicle based on the difference signal;
   evaluating an amplitude curve of each reflected signal; and
   determining whether each reflected signal does not essentially originate from objects in the environment of the vehicle based on the evaluation of the amplitude curve.

2. The method as recited in claim 1, further comprising:
   informing, by at least one of an optical display and an acoustic signal, the driver regarding the asymmetrical load state.

3. The method as recited in claim 1, further comprising:
   calibrating the sensors in response to the determined load state of the vehicle, wherein the calibration includes at least modifying a subsequent evaluation of the reflected signals.

4. The method as recited in claim 1, further comprising:
   checking whether each reflected signal does not essentially originate from objects in the environment of the vehicle; wherein the checking includes determining whether an amplitude curve of each reflected signal has characteristics resulting from an environmental object present in the region of the roadway surface situated next to the vehicle.

5. The method as recited in claim 1, further comprising:
   calibrating the sensors in response to the determined load state of the vehicle; wherein the calibration of the sensors includes modifying the evaluation of the reflected signals such that subsequent reflected signals are evaluated as if the vehicle was in at least one of a uniformly loaded state and an unloaded state.

6. The method as recited in claim 1, wherein the evaluation of the reflected signal includes evaluating an amplitude curve of the reflected signal.

7. A device for recognizing and evaluating an asymmetrical load state of a vehicle, comprising:
   at least one transmitter for emitting an output signal;
   at least one sensor situated on the vehicle for receiving a reflected signal corresponding to the output signal reflected from a region of a roadway surface situated next to the vehicle; and
   an evaluation unit evaluating the reflected signal to determine whether an asymmetrical load state of the vehicle is present;
   wherein the at least one sensor is provided on a side region of the vehicle;
   wherein two sensors are provided on two vehicle sides situated opposite one another, each sensor receiving a reflected signal from a region of the roadway surface corresponding to a side of the vehicle on which the respective sensor is provided;
   wherein the reflected signals are evaluated by (i) generating a difference signal by comparing the reflected signals received by the two sensors, and (ii) recognizing an asymmetrical load state of the vehicle based on the difference signal; and wherein the evaluation device evaluates an amplitude curve of each reflected signal and determines whether each reflected signal does not essentially originate from objects in the environment of the vehicle based on the evaluation of the amplitude curve.

8. The device as recited in claim 7, further comprising:
at least one of an optical display device and an acoustic signaling device for signaling to the driver information regarding the asymmetrical load state.

9. The device as recited in claim 7, wherein the evaluation device calibrates the sensors in response to the determined load state of the vehicle, wherein the calibration includes modifying at least a subsequent evaluation of the reflected signals.

10. The device as recited in claim 7, wherein the sensors are distance sensors configured as at least one of an ultrasound sensor, a radar sensor and a lidar sensor.

11. The device as recited in claim 7, wherein the evaluation device checks whether each reflected signal does not essentially originate from objects in the environment of the vehicle; wherein the check includes a determination of whether an amplitude curve of each reflected signal has characteristics resulting from an environmental object present in the region of the roadway surface situated next to the vehicle.

12. The device as recited in claim 7, wherein the evaluation device calibrates the sensors in response to the determined load state of the vehicle; wherein the calibration of the sensors includes modifying the evaluation of the reflected signals such that subsequent reflected signals are evaluated as if the vehicle was in at least one of a uniformly loaded state and an unloaded state.

13. The device as recited in claim 7, wherein the evaluation of the reflected signal includes evaluating an amplitude curve of the reflected signal.

* * * * *